Aug. 30, 1927.

J. STRAND

PLASTER BOARD

Filed June 18, 1925

1,640,736

INVENTOR.
Joseph Strand.
BY
Dewey, Strong, Townsend & Loftus
ATTORNEYS.

Patented Aug. 30, 1927.

1,640,736

UNITED STATES PATENT OFFICE.

JOSEPH STRAND, OF LOS ANGELES, CALIFORNIA.

PLASTER BOARD.

Application filed June 18, 1925. Serial No. 37,926.

This invention relates to building construction, and particularly pertains to plaster board.

In the use of plaster board, it has been found desirable to provide the board with bonding members which will tend to form a plastic or mechanical bond between the surface of the plaster board and the plastic material applied thereto. Various shapes of protrusions have been formed on the surface of plastic board for this purpose and additional bonding members have been applied, as for example, staples as shown in my co-pending application, entitled Wall board lath, filed Sept. 24, 1924, Ser. No. 739,557. The present invention is an improvement thereon, in that staples have been provided and applied in a manner to hold them rigidly in position and present them most advantageously for forming a mechanical bond between plaster board and plastic material applied thereto.

It is also an object of the invention where buildings are constructed with exterior plaster work to enable the staples of the plaster board to serve as furring members to hold reticulated material such as woven wire in uniformly spaced distance from the surface of the plaster board exteriorly of the building at the wall to which the plaster board is applied to enable the reticulated material to form a bond with the plastic material and to insure a uniform thickness of the plastic material.

The invention is illustrated by way of example in the accompanying drawings, in which.

Figure 1:
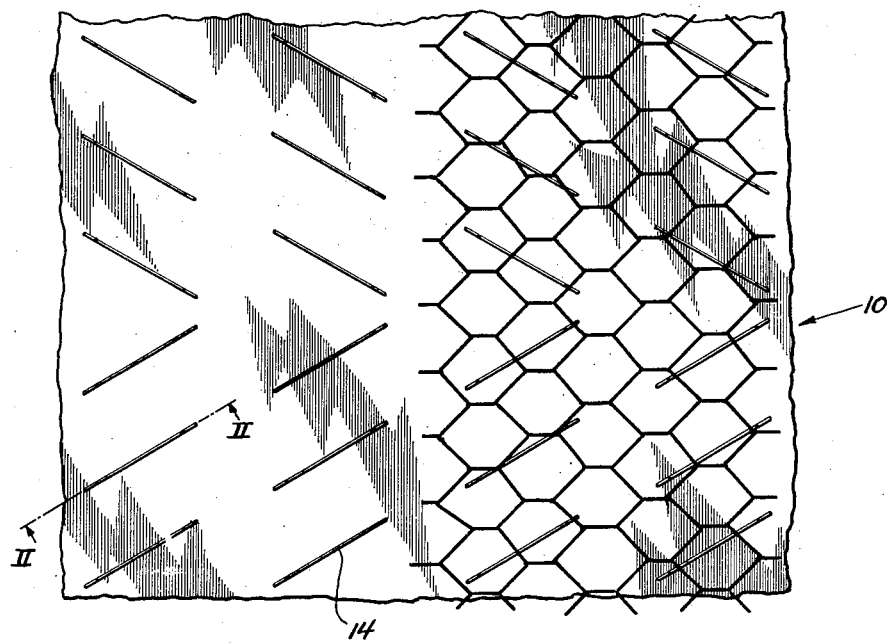
Fig. 1 is a view in plan showing the plaster board embodying the present invention.

Referring more particularly to the drawings, 10 indicates a plaster board here shown as being formed with a body thickness 11 covered upon the opposite sides with layers of paper or other material indicated at 12 and 13. In the present instance plastic material is intended to be applied to the surface of the paper cover 12, and in order to create a bond mechanically between the plastic material and the plaster board, bonding members 14 are provided. These are here shown as being in the form of wire staples having body portions 15 of considerable length, and which body portions at their opposite ends are bent first at right angles and then longitudinally to their main length to form shoulders 16.

Figure 2:
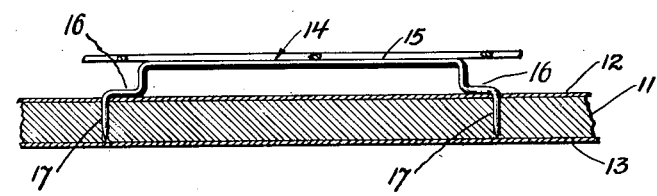
Fig. 2 is an enlarged view in section through the plaster board as seen on the line 2—2 of Fig. 1, and clearly disclosing the formation and application of the mechanical fastener.
Figure 3:
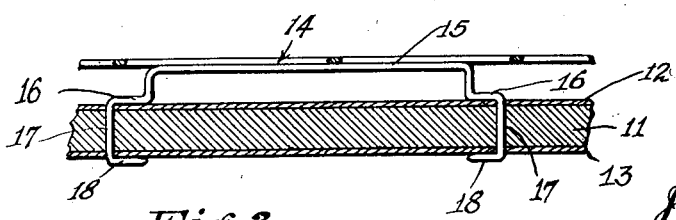
Fig. 3 is a similar view showing the prongs clinched at the inner face of the plaster board.

Points 17 form continuations of the shoulders at right angles thereto and are adapted to penetrate the body of the board. If desired these portions 17 may be of sufficient length so that they may pass completely through the board and be clinched on the opposite side thereof, as indicated by dotted lines at 18 in Fig. 2. The main body portions 15 of the bonding members extend parallel to the surface of the board and are spaced a slight distance therefrom. In practice this distance is approximately one eighth of an inch, and the length of the member 15 from shoulder to shoulder is approximately two and one-half inches. These dimensions, of course, may be varied as convenience dictates.

By reference to Fig. 1, it will be seen that the bonding members 14 are arranged in parallel rows extending throughout the length of the board. It will be further noted that the bonding members are disposed at angles to the length of the rows, thus providing the boards with a number of spaced diagonally disposed mechanical bonding members.

In operation it has been found that if all of the bonding members are disposed at the same angle and inclined in the same direction, the plaster board will not readily stack and remain in its stacked position during transit. In order to obviate this the angle of inclination is reversed throughout a part of each row.

It will also be readily appreciated that when buildings are constructed with exterior plaster work the present invention will be of considerable importance as it is common practice to apply reticulated material, such as woven wire, to the exterior surface of the building to form a bond with the plastic material thereafter applied. In common practice it is often difficult to insure that the sheet of reticulated material will be held in uniformly spaced distance from the surface of the wall, and by building the wall with the plaster board here shown, it is evident that the bonding members will serve as spacing means between the outer surface of the plaster board and the sheet of reticulated material, thus insuring that a uniform space will be formed between the screen and the plaster board creating a uniform bond and making it possible to apply plaster to the wall in uniform thickness.

It will thus be seen that by forming the bonding members 14 with shoulders 16, the bonding members will remain in their fixed position and will not be forced further into or through the plaster board if pressure is exerted against them as would be the case if the shoulders were not present. It will also be evident that by the arrangement of bonding members and their fixed relation to each other and to the surface of the plaster board, a suitable plastering surface will be provided having material advantages over other plaster boards now being used.

While I have shown the preferred form of my invention as now known to me, it is to be understood that various changes may be made in its construction without departing from the spirit of the invention as defined in the appended claims.

Having thus described my invention, what I claim and desire to secure by Letters Patent is:

1. As an article of manufacture a plaster board of comparatively large area for use in sheathing building walls, furring members applied thereto and distributed over the surface thereof prior to its being applied to a building wall, said furring members consisting of elongated staples, the main body portion of the staples being disposed parallel to the surface of the board and spaced therefrom, the opposite ends of the body portion being bent at right angles and then parallel to the main body portion to form shoulders abutting against the surface of the board, said ends of the staples terminating in prongs projecting through the board and clinched to maintain the staples in position on the board, said staples being arranged in spaced rows on the board and inclined to the horizontal when the board is disposed vertically, the staples in each row being arranged in groups oppositely inclined.

2. As an article of manufacture, a plaster board for use in sheathing building walls, furring members applied thereto and distributed over the surface thereof, said furring member consisting of elongated staples, the main body portion of the staples being disposed parallel to the surface of the board and spaced therefrom, the opposite ends of the body portion being bent at angles and then parallel to the main body portion to form shoulders abutting the surface of the board, said ends of the staples terminating in prongs projecting through the board and clinched to maintain the staples in position on the board, said staples being arranged in spaced rows on the board and inclined to the horizontal when the board is disposed vertically.

3. As an article of manufacture, a plaster board for use in sheathing building walls, furring members applied thereto and distributed over the surface thereof, said furring members consisting of elongated staples, the main body portion of the staples being disposed parallel to the surface of the board and spaced therefrom, the opposite ends of the body portion being bent at angles and then parallel to the main body portion to form shoulders abutting the surface of the board, said ends of the staples terminating in prongs projecting through the board and clinched to maintain the staples in position on the board, said staples being arranged in spaced rows on the board, the staples in the various rows being arranged in groups oppositely inclined.

4. As an article of manufacture, wall board for building purposes, comprising means forming the body of the board of suitable or requisite thickness, and staple-like wire devices inserted through said board and formed and clinched to hold them rigidly therein preventing said devices from pushing in or pulling out with the head of each staple-like device spaced a distance from the face of the board which is to receive the plaster or other coating.

JOSEPH STRAND.